(12) United States Patent
Tajima et al.

(10) Patent No.: US 6,404,162 B1
(45) Date of Patent: Jun. 11, 2002

(54) VARIABLE-SPEED CONTROLLING DEVICE FOR USE WITH AN INDUCTION MOTOR

(75) Inventors: Hirokazu Tajima, Tokyo; Shinichi Ishii, Saitama; Hidetoshi Umida, Tokyo, all of (JP)

(73) Assignee: Fuji Electric Co., Ltd., Kawasaki (JP)

( * ) Notice: Subject to any disclaimer, the term of this patent is extended or adjusted under 35 U.S.C. 154(b) by 0 days.

(21) Appl. No.: 09/565,002

(22) Filed: May 4, 2000

(30) Foreign Application Priority Data

May 21, 1999 (JP) .......................................... 11-141408

(51) Int. Cl.$^7$ ................................................ H02P 5/28
(52) U.S. Cl. ...................................... 318/799; 318/809
(58) Field of Search ............................... 318/798, 799, 318/800, 801, 805, 809, 812

(56) References Cited

U.S. PATENT DOCUMENTS

| | | | | |
|---|---|---|---|---|
| 5,532,570 A | * | 7/1996 | Tajima et al. | 318/809 |
| 5,828,199 A | * | 10/1998 | Tajima et al. | 318/779 |
| 5,841,263 A | * | 11/1998 | Kaneko et al. | 318/807 |
| 5,859,521 A | * | 1/1999 | Tajima et al. | 318/809 |
| 5,861,728 A | * | 1/1999 | Tazawa et al. | 318/778 |
| 5,959,429 A | * | 9/1999 | Tajima et al. | 318/799 |
| 6,043,617 A | * | 3/2000 | Matsumoto et al. | 318/52 |

FOREIGN PATENT DOCUMENTS

| | | |
|---|---|---|
| JP | 6369491 | 3/1988 |
| JP | 64-8896 | 1/1989 |
| JP | 01648896 | 1/1989 |
| JP | 01110091 | 4/1989 |
| JP | 01110092 | 4/1989 |
| JP | 0608571 A2 * | 8/1994 |
| JP | 07264900 | 10/1995 |
| JP | 0637870 B1 * | 5/1997 |

* cited by examiner

*Primary Examiner*—Robert E. Nappi
*Assistant Examiner*—Rina I. Duda
(74) *Attorney, Agent, or Firm*—Greer, Burns & Crain, Ltd.

(57) ABSTRACT

The present invention provides a variable-speed controlling device for use with an induction motor, which includes a means for compensating for the discrepancy between a secondary magnetic flux instruction value and a secondary magnetic flux actually occurring in an induction motor, realizes a satisfactory control by generating the secondary magnetic flux according to the instruction value, and can generate desired torque and improve a motor efficiency. The variable-speed controlling device according to the present invention, for use with an induction motor, includes a voltage instruction value calculating unit, an integrating unit, a power converting circuit, a current detecting unit, an induced voltage calculating unit, a position discrepancy amount calculating unit, and a compensating unit.

7 Claims, 7 Drawing Sheets

VARIABLE-SPEED CONTROLLING DEVICE FOR USE WITH AN INDUCTION MOTOR

BACKGROUND OF THE INVENTION

1. Field of the Invention

The present invention relates to a variable-speed controlling device which calculates an AC (Alternating Current) voltage instruction value by using a primary angular frequency instruction value and a secondary magnetic flux instruction value, and drives an induction motor by providing this voltage instruction value to a power converting circuit such as an inverter, etc.

2. Description of the Related Art

FIG. 1 is a block diagram showing the whole of a conventional variable-speed controlling device for use with an induction motor.

In this figure, a voltage instruction value calculating circuit 4 calculates voltage instruction values $v_{1d}^*$ and $v_{1q}^*$ in a rotating coordinate system (d-q axes) based on a primary angular frequency instruction value $\omega_1^*$ and a secondary magnetic flux instruction value $\phi_2^*$, which are output from an instruction value generating circuit 3, and outputs the calculated values. Next, an integrator 5, to which $\omega_1^*$ is input, calculates a phase angle instruction value $\theta^*$.

Here, assume that the rotating coordinate system rotates at an angular velocity equal to the primary angular frequency instruction value $\omega_1^*$, its d-axis is a coordinate axis matching the direction of the phase angle instruction value $\theta^*$, and its q-axis is a coordinate axis orthogonal to the d-axis.

A coordinate transforming circuit 7, to which the voltage instruction values $v_{1d}^*$ and $v_{1q}^*$ are input, performs a rotating coordinate transformation according to the phase angle instruction value $\theta^*$, and outputs an AC voltage instruction value vector $v_1^*$. A power converting circuit 1 such as an inverter, etc. outputs an AC voltage of each phase according to the AC voltage instruction value vector $v_1^*$, and drives an induction motor 2.

In the above described conventional variable-speed controlling device, a discrepancy may sometimes occur between a secondary magnetic flux instruction value $\phi_2^*$ determined according to the direction of the phase angle instruction value $\theta^*$ and the secondary magnetic flux occurring in the induction motor 2, due to a calculation error in the voltage instruction value calculating circuit 4, an error between the instruction value of the AC voltage output from the power converting circuit 1 and an actual value, or the like.

As a result, the magnetic flux according to an instruction value cannot be generated, which leads to a decrease in generated torque or in a motor efficiency, etc.

SUMMARY OF THE INVENTION

An object of the present invention is to provide a variable-speed controlling device for use with an induction motor, which comprises a means for compensating for the discrepancy between a secondary magnetic flux instruction value and a secondary magnetic flux actually occurring in an induction motor, realizes a satisfactory control by generating the secondary magnetic flux according to the instruction value, and can generate desired torque and improve a motor efficiency, so as to overcome the above described problems.

The variable-speed controlling device according to the present invention, for use with an induction motor, is configured to comprise a voltage instruction value calculating unit, an integrating unit, a power converting circuit, a current detecting unit, a voltage detecting unit, an induced voltage calculating unit, a primary angular frequency compensation amount calculating unit, and a compensating unit.

In a first aspect of the present invention, the voltage instruction value calculating unit calculates an AC voltage instruction value on d-q axes rotating coordinates rotating at an angular velocity equal to a primary angular frequency instruction value by using the primary angular frequency instruction value and a secondary magnetic flux instruction value. The integrating unit calculates a phase angle instruction value by integrating the primary angular frequency instruction value. The power converting circuit performs power conversion according to the AC voltage instruction value obtained from the AC voltage instruction value and the phase angle instruction value, and supplies an AC voltage to the induction motor. The current detecting unit detects the current of the induction motor. The induced voltage calculating unit calculates the d-axis component of the induced voltage vector of the induction motor from the AC voltage instruction value vector, the output of the current detecting unit, a first primary angular frequency instruction value, and a motor constant. The primary angular frequency compensation amount calculating unit calculates a primary angular frequency compensation amount from the first primary angular frequency instruction value and the calculation result of the d-axis component of the induced voltage vector from the induced voltage calculating unit. The compensating unit generates a second primary angular frequency instruction value provided to the voltage instruction value calculating unit and the integrating unit by adding the primary angular frequency compensation amount to the first primary angular frequency instruction value.

In a second aspect of the present invention, the voltage instruction value calculating unit calculates an AC voltage instruction value on d-q axes rotating coordinates rotating at an angular velocity equal to the primary angular frequency instruction value by using the primary angular frequency instruction value and the secondary magnetic flux instruction value. The integrating unit calculates a phase angle instruction value by integrating the primary angular frequency instruction value. The power converting circuit performs power conversion according to the AC voltage instruction vector obtained from the AC voltage instruction value and the phase angle instruction value, and supplies an AC voltage to the induction motor. The current detecting unit detects the current of the induction motor. The voltage detecting unit detects the terminal voltage of the induction motor. The induced voltage calculating unit calculates the d-axis component of the induced voltage vector of the induction motor from the output of the voltage detecting unit, the output of the current detecting unit, the first primary angular frequency instruction value, and the motor constant. The primary angular frequency compensation amount calculating unit calculates the primary angular frequency compensation amount from the first primary angular frequency instruction value and the calculation result of the d-axis component of the induced voltage vector from the calculation of the induced voltage calculating unit. The compensating unit generates the second primary angular frequency instruction value provided to the voltage instruction value calculating unit and the integrating unit by adding the primary angular frequency compensation amount to the first primary angle frequency instruction value.

DESCRIPTION OF THE PREFERRED EMBODIMENTS

Figure 1:
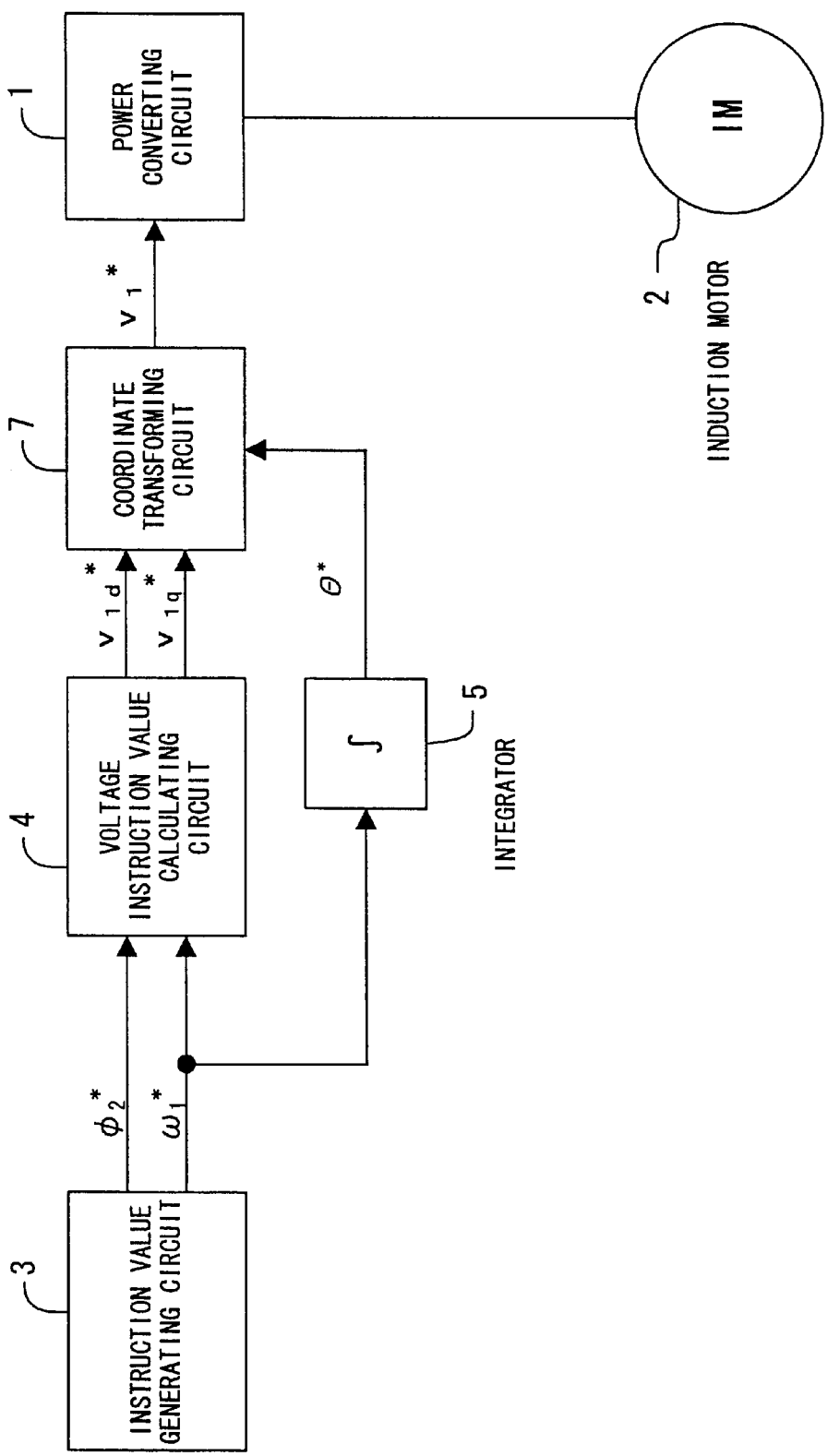
FIG. 1 is a block diagram showing the whole of a conventional variable-speed controlling device for use with an induction motor.

Hereinafter, preferred embodiments according to the present invention are described by referring to the drawings.

First of all, an equation of the voltage of an induction motor, which is observed in a d-q axes rotating coordinate system, is represented by the following expression 1.

$$\begin{bmatrix} v_{1d} \\ v_{1q} \\ 0 \\ 0 \end{bmatrix} = \begin{bmatrix} R_1 + pL_\sigma & -\omega_1 L_\sigma & p & -\omega_1 \\ \omega_1 L_\sigma & R_1 + pL_\sigma & \omega_1 & p \\ -R_2 & 0 & p+1/\tau_2 & -\omega_1+\omega_2 \\ 0 & -R_2 & \omega_1-\omega_2 & p+1/\tau_2 \end{bmatrix} \begin{bmatrix} i_{1d} \\ i_{1q} \\ \phi_{2d} \\ \phi_{2q} \end{bmatrix}$$ [expression 1]

where $v_{1d}$ is the d-axis component of a primary voltage, $v_{1q}$ is the q-axis component of the primary voltage, $i_{1d}$ is the d-axis component of a primary current, $i_{1q}$ is the q-axis component of the primary current, $\phi_{2d}$ is the d-axis component of a secondary flux, $\phi_{2q}$ is the q-axis component of the secondary magnetic flux, $R_1$ is the resistance of a primary (stator) winding, $R_2$ is the resistance of a secondary (rotor) conductor, $L\sigma$ is a leakage inductance, $\omega_1$ is a primary angular frequency, $\omega_2$ is a secondary (rotor) angular frequency, $\tau_2$ is a secondary time constant, and p is a differential operator (=d/dt).

Considered here is the case where there are no errors between the voltage, the current, and the motor constant, which are used in the calculation of the expression 1 in a variable-speed controlling device, and those of the induction motor controlled. At this time, there is no discrepancy between the direction of the secondary magnetic flux $\phi_2$ of the induction motor and the secondary magnetic flux instruction value $\phi_2^*$ of the variable-speed controlling device.

If the primary angular frequency instruction value $\omega_1^*$ and the secondary magnetic flux instruction value $\phi_2^*$ are given, $\phi_{2d} = \phi_{2q}^*$, $\phi_{2q}=0$, and $\omega_1=\omega_1^*$ can be set in the expression (1) The d-axis component $v_{1d}^*$ and the q-axis component $v_{1q}^*$ of the primary voltage instruction value are represented by an expression 2.

$v_{1d}^* = (R_1+pL\sigma)i_{1d}-\omega_1^*L\sigma i_{1q}$ [Expression 2]

$v_{1q}^* = \omega_1^*\phi_2^*+(R_1+pL\sigma)i_{1q}\omega_1^*L\sigma i_{1d}$

Considered next is an induced voltage vector $e_2=(e_{2d}, e_{2q})^T$ of the secondary circuit of the induction motor (hereinafter referred to as an induced voltage. $()^T$ represents the transposed matrix of a matrix $()$).

By transforming the first and the second lines of the above described expression 1, the d-axis component $e_{2d}$ and the q-axis component $e_{2q}$ of the induced voltage are represented by the following expression (3). Here, $v_{1d}$ and $v_{1q}$ in the expression 3 can be obtained from the AC voltage instruction value vector $v_1^*$ input to the power converting circuit or the terminal voltage detection value of the induction motor.

$e_{2q}=\omega_1\Phi_{2d}+p\Phi_{2q=v1q}-(R_{1+}pL\sigma)i_{1q}-\omega_1 L\sigma i_{1d}$ [Expression 3]

Considered next is the above described case where a discrepancy occurs between the direction of the secondary magnetic flux $\phi_2$ of the induction motor and the secondary magnetic flux instruction value $\phi_2^*$ of the variable controlling device due to a calculation error of the AC voltage instruction value, or the like.

Figure 2:
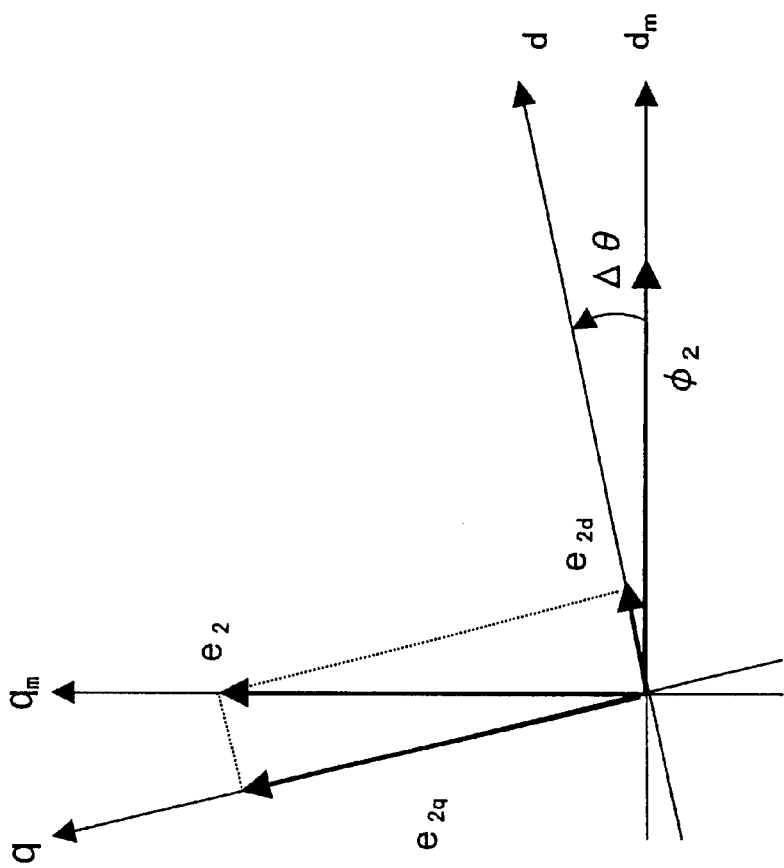
FIG. 2 is a vector diagram showing the relationship between an induced voltage and a magnetic flux.

FIG. 2 is a vector diagram showing the relationship between the induced voltage $e_2$ and the secondary magnetic flux $\phi_2$.

In this figure, d-q axes are coordinate axes used in the internal calculations of a variable-speed controlling device, while $d_m$-$q_m$ axes are coordinate axes based on the secondary magnetic flux $\phi_2$ of the induction motor.

Since the induced voltage $e_2$ is orthogonal to the secondary magnetic flux $\phi_2$, the d-axis component $e_{2d}$ of the induced voltage $e_2$ is "0" if no discrepancy exists between the coordinate axes (d-q axes) of the variable-speed controlling device and those ($d_m$-$q_m$ axes) of the induction motor. If the discrepancy exists, $e_{2d}\neq 0$.

Furthermore, assuming that an axial discrepancy angle is $\Delta\theta$ as shown in FIG. 2, the signs of $\Delta\theta$ and $e_{2d}$ have the relationship represented by an expression 4 depending on the (positive/negative) sign of the primary angular frequency instruction value $\omega_1^*$.

Suppose that $\omega_1^*>0$. [Expression 4]

If $\Delta\theta>0$, $e_{2d}>0$
If $\Delta\theta<0$, $e_{2d}<0$

Suppose that $\omega_1^*<0$.

If $\Delta\theta>0$, $e_{2d}<0$
If $\Delta\theta<0$, $e_{2d}>0$

Accordingly, a proportional operation or a proportional integration operation, which uses the d-axis component $e_{2d}$ of the induced voltage $e_2$ as an input, is performed, a signal (primary angular frequency compensation amount) $\Delta\omega_1$ obtained by adding the sign data of a first (original) primary angular frequency instruction value $\omega_1^*$ to the result of the operation, is compensated for the first primary angular frequency instruction value $\omega_1^*$, and its result is used as a second primary angular frequency instruction value $\omega_1^{**}$ for the input to the voltage instruction value calculation and the phase angle instruction value calculation, so that the operation for reducing the axial discrepancy angle $\Delta\theta$ to "0" can be implemented.

Expressions 5 and 6 are the calculation expressions of the signal $\Delta\omega_1$ and the second primary angular frequency instruction value $\omega_1^{**}$. This is an example where the proportional integration operation is performed by using $e_{2d}$ as an input. In the expression 5, $sgn(\omega_1^*)$ is the sign data of $\omega_1^*$. If $\omega_1^*\geq 0$, $sgn(\omega_1^*)=1$. If $\omega_1^*<0$, $sgn(\omega_1^*)=-1$. Additionally, $K_p$ is a proportional gain, and $T_I$ is an integration time constant.

$$\Delta\omega_1 = sgn(\omega_1^*) \cdot K_p\{e_{2d} + (1/T_I)\int e_{2d}dt\}$$ [Expression 5]

$$\omega_1^{**} = \omega_1^* - \Delta\omega_1$$ [Expression 6]

As described above, the present invention pays attention to the fact that the d-axis component $e_{2d}$ of the induced voltage $e_{2d}$ does not become "0" if there is an axial discrepancy between the coordinate axes of a variable-speed controlling device and those of an induction motor, and if a discrepancy occurs between the direction of the secondary magnetic flux $\phi_2$ of the induction motor and the secondary magnetic flux instruction value $\phi_2^*$ of the variable-speed controlling device, and aims at adjusting the primary angular frequency instruction value in order to reduce the axial discrepancy angle to "0".

In one embodiment of the present invention, a variable-speed controlling device includes a voltage instruction value calculating unit to calculate an AC voltage instruction value on d-q axes rotating coordinates rotating at an angle velocity equal to a primary angular frequency instruction value by using the primary angular frequency instruction value and a secondary magnetic flux instruction value; an integrating unit to calculate a phase angle instruction value by integrating the primary angular frequency instruction value; a power converting circuit to perform power conversion according to the AC voltage instruction value vector obtained from the AC voltage instruction value and the phase angle instruction value, and to supply an AC voltage to an induction motor; a current detecting unit to detect the current of the induction motor; an induced voltage calculating unit to calculate the d-axis component (the axis component in the same direction as that of the phase angle instruction value) of the induced voltage vector of the induction motor from the AC voltage instruction value vector, the output of the current detecting unit, a first primary angular frequency instruction value, and a motor constant; a primary angular frequency compensation amount calculating unit calculating the primary angular frequency compensation amount from the first primary angular frequency instruction value and the calculation result of the d-axis component of the induced voltage vector from the induced voltage calculating unit; and a compensating unit to generate a second primary angular frequency instruction value provided to the voltage instruction value calculating unit and the integrating unit by adding the primary angular frequency compensation amount to the first primary angular frequency instruction value.

In another embodiment, the induced voltage calculating unit calculates the d-axis component of the induced voltage vector from the output of a terminal voltage detecting unit of the induction motor, the output of the current detecting unit, the first primary angular frequency instruction value, and the motor constant.

The primary angular frequency compensation amount calculating unit may perform a proportional operation by using the d-axis component of the induced voltage vector as an input, and calculates a primary angular frequency compensation amount by multiplying the result of the operation and the sign data of the first primary angular frequency instruction value. The primary angular frequency compensation amount calculating unit can also perform a proportional integration operation by using the d-axis component of the induced voltage vector as an input, and calculates a primary angular frequency compensation amount by multiplying the result of the operation and the sign data of the first primary angular frequency instruction value. Another alternative may be that the primary angular frequency compensation amount calculating unit performs a proportional operation by using the d-axis component of the induced voltage vector as an input, and calculates a primary angular frequency compensation amount by multiplying the result of the operation and the sign data of the first primary angular frequency instruction value or primary angular frequency compensation by using the d-axis component of the induced voltage vector, and calculates a primary angular frequency compensation amount by multiplying the result of the operation and the sign data of the first primary angular frequency instruction value.

According to the invention recited in claim 6, the above described position discrepancy amount calculating unit performs a proportional integration operation by using the d-axis component of the induced voltage vector, and calculates a position discrepancy amount by multiplying the result of the operation and the sign data of the first primary angular frequency instruction value, in the variable-speed controlling device recited in claim 2.

The present invention can further include a voltage instruction value calculating unit for calculating an AC voltage instruction value on d-q axes rotating coordinates rotating at an angular velocity equal to a primary angular frequency instruction value by using the primary angular frequency instruction value and a secondary magnetic flux instruction value; an integrating unit for calculating a phase angle instruction value by integrating the primary angular frequency instruction value; a power converting circuit for performing power conversion according to the AC voltage instruction value vector obtained from the AC voltage instruction value and the phase angle instruction value, and supplying an AC voltage to an induction motor; a current detecting unit for detecting the current of the induction motor; an induced voltage calculating unit for calculating the d-axis component (the axis component in the same direction as that of the phase angle instruction value) of an induced voltage vector of the induction motor from the AC voltage instruction value vector, the output of the current detecting unit, a first primary angular frequency instruction value, and a motor constant; a primary angular frequency compensation amount calculating unit calculating a primary angular frequency compensation amount from the first primary angular frequency instruction value and the calculation result of the d-axis component of the induced voltage vector from the induced voltage calculating unit; and a compensating unit for generating a second primary angular frequency instruction value provided to the voltage instruction value calculating unit and the integrating unit by adding the primary angular frequency compensation amount to the first primary angular frequency instruction value.

Hereinafter, the preferred embodiments according to the present invention are further described in detail, by referring to the drawings.

Figure 3A:
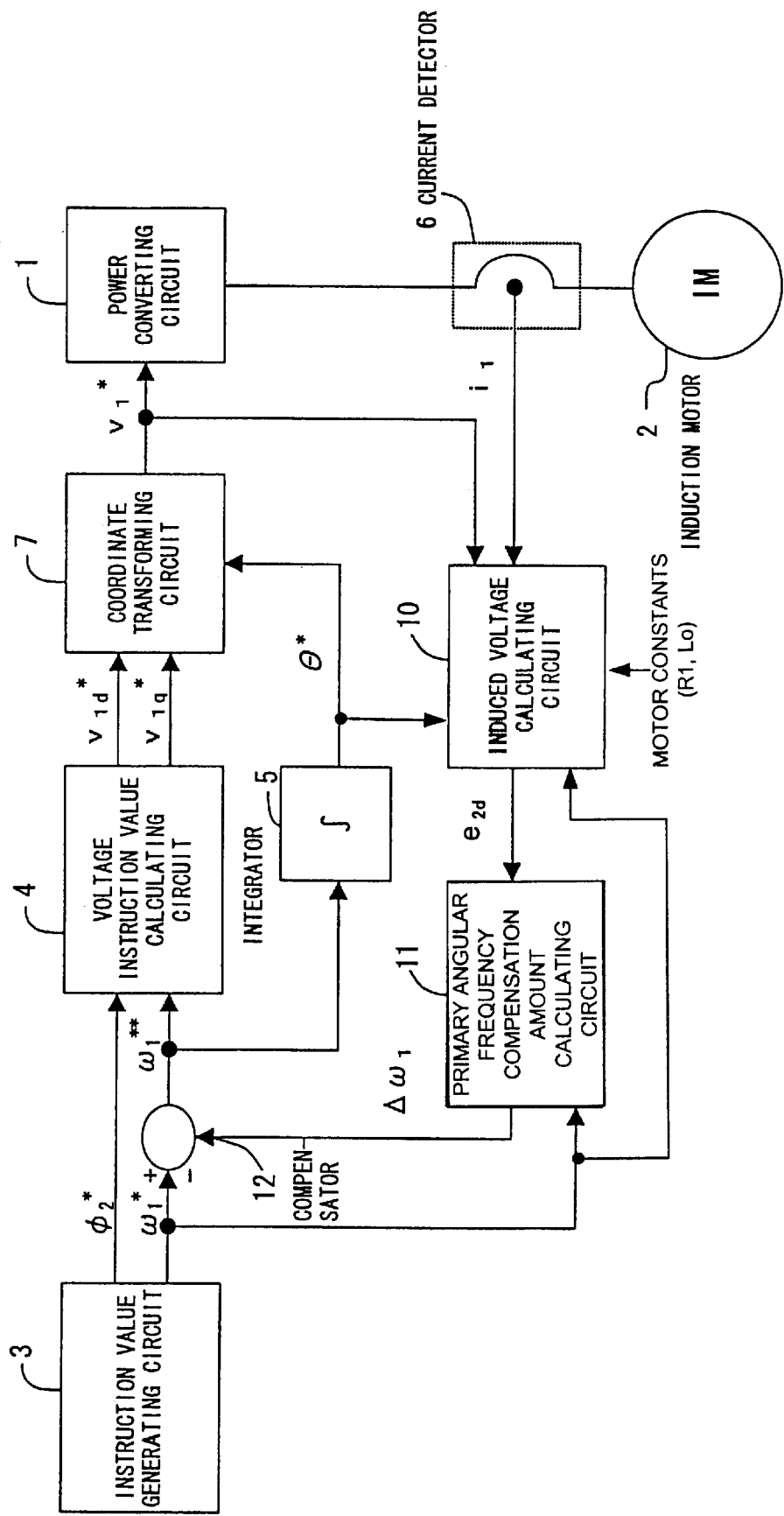
FIG. 3 is a block diagram showing the configuration of a first preferred embodiment according to the present invention.
Figure 3B:
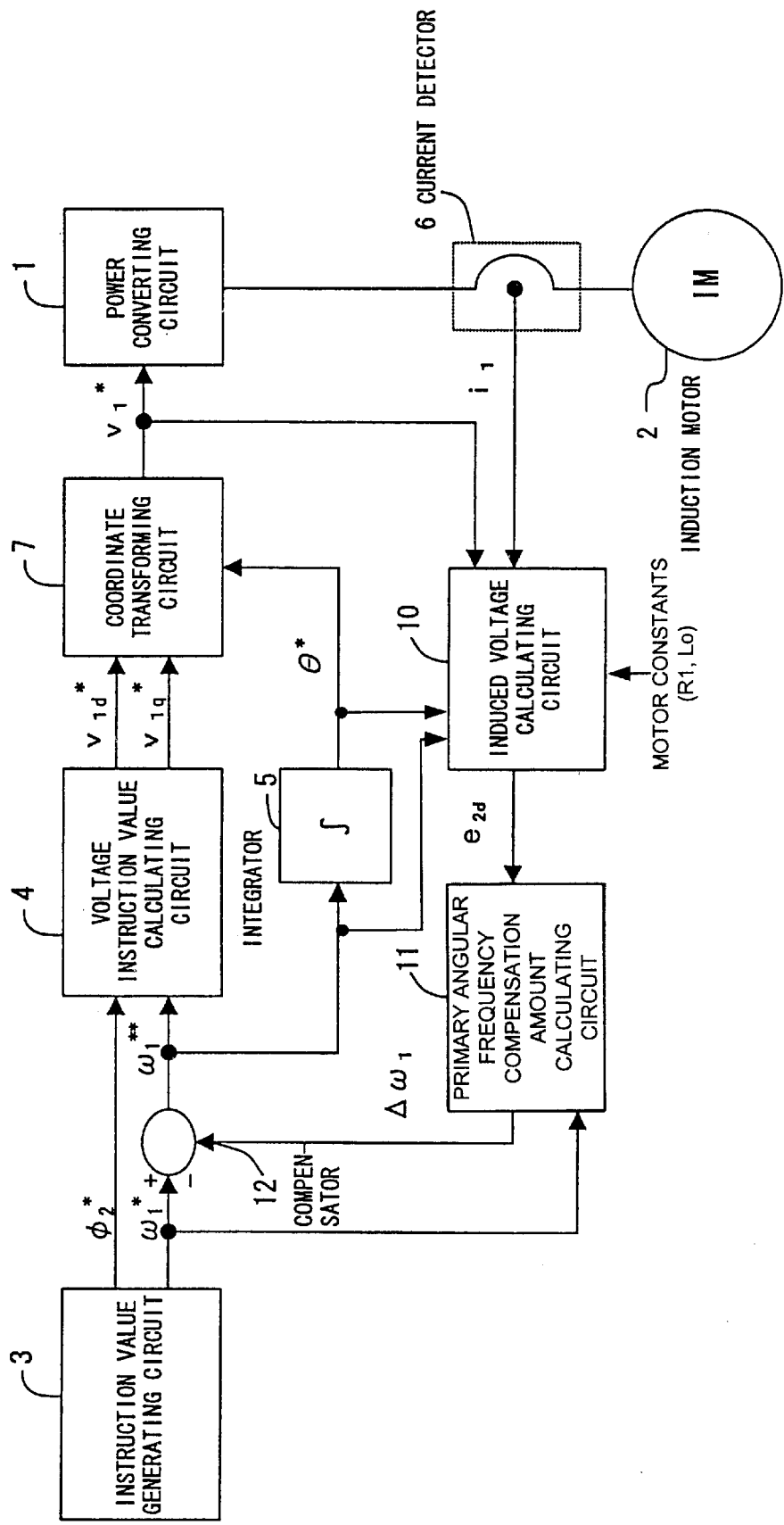

In FIG. 3, the instruction value generating circuit 3 outputs a primary angular frequency instruction value $\omega_1^*$ (a first primary angular frequency instruction value $\omega_1^*$) and a secondary magnetic flux instruction value $\Phi_2^*$. The primary angular frequency instruction value $\omega_1^*$ is input to a compensator 12 implemented by an adder, a primary angular frequency compensation amount $\Delta\omega_1$, which will be described later, from a primary angular frequency compensation amount calculating circuit 11 is subtracted therefrom, and a second primary angular frequency instruction value $\omega_1^{**}$ is output. The voltage instruction value calculating circuit 4 calculates the voltage instruction values $v_{1d}^*$ and $v_{1q}^*$ on the d-q axes by using $\Phi_2^*$ and $\omega_1^{**}$ as inputs. The integrator 5 calculates the phase angle instruction value $\theta^*$ by integrating $\omega_1^{}$. The coordinate transforming circuit 7** performs coordinate transformation according to $\theta^*$ for $v_{1d}^*$ and $v_{1q}^*$, and calculates the AC voltage instruction value vector $v_1^*$. The power converting circuit 1 such as an inverter, etc. generates an AC voltage of each phase based on this vector $v_1^*$, and drives the induction motor 2.

An induced voltage calculating circuit 10 calculates a d-axis component $e_{2d}$ of the induced voltage $e_2$ of the induction motor 2 based on the above described expression 3 by using as inputs the AC voltage instruction value $v_1^*$ and a current detection value $i_1$ obtained from a current detector 6.

This d-axis component $e_{2d}$ and the first primary angular frequency instruction value $\omega_1^*$ are input to the position discrepancy amount calculating circuit 11, which calculates the primary angular frequency compensation amount $\Delta\omega_1$ by using the above described expression 5. This primary angular frequency compensation amount $\Delta\omega_1$ is input to the compensator 12 with the signs (either of the signs?) shown in FIG. 3, and subtracted from the first primary angular frequency instruction valued $\omega_1^*$, so that the second primary angular frequency instruction value $\omega_1^{**}$ is calculated.

As a result, as represented by the expression 4, control for reducing the axial discrepancy angle $\Delta\theta$ to "0" according to the d-axis component $e_{2d}$ of the induced voltage $e_2$ and the sign of the first primary angular frequency instruction value $\omega_1^*$ is enabled, whereby the coordinate axes (d-q axes) of the variable-speed controlling device and those ($d_m$-$q_m$ axes) of the induction motor can be aligned.

Figure 4:
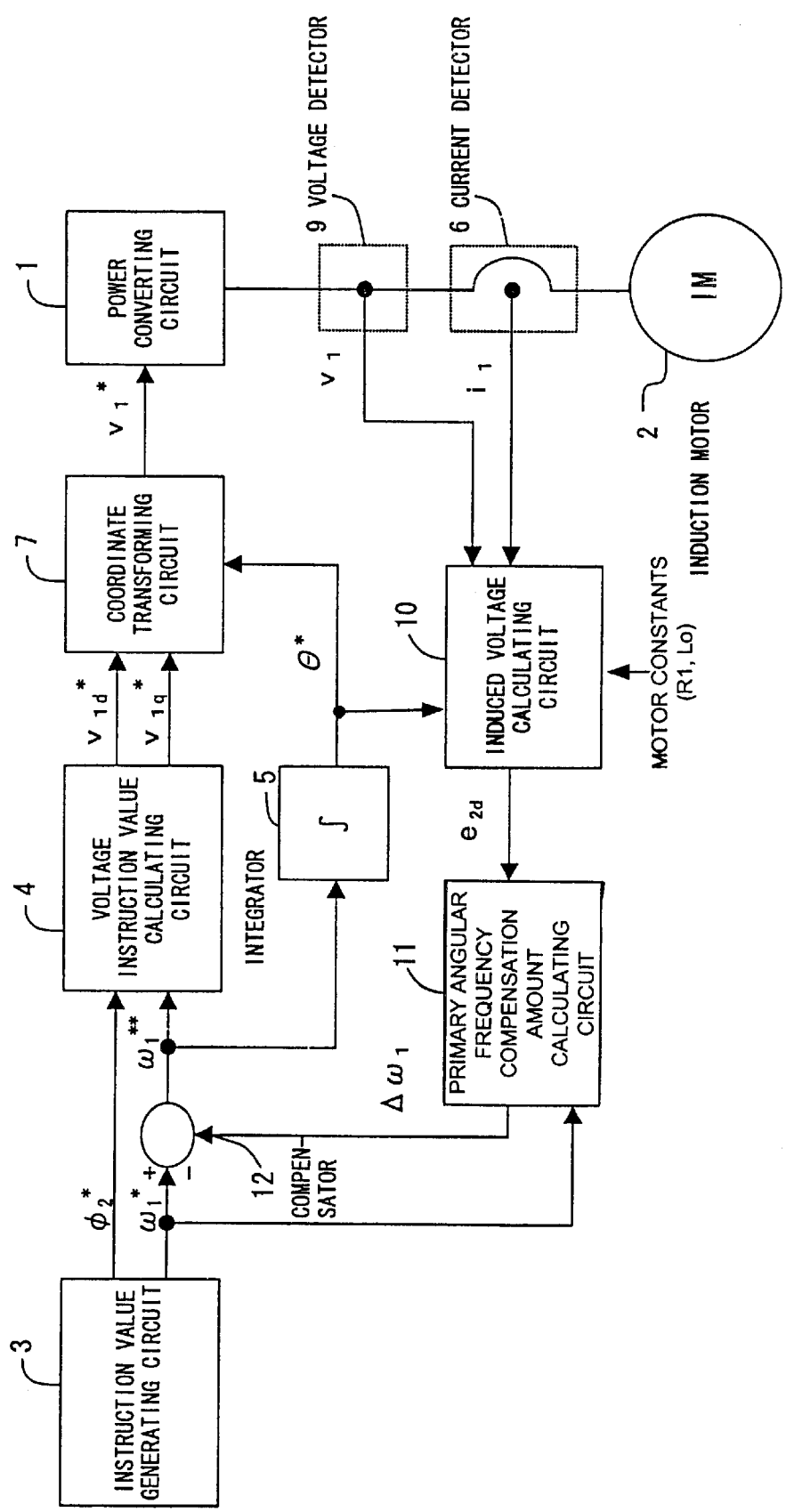
FIG. 4 is a block diagram showing the configuration of a second preferred embodiment according to the present invention.

FIG. 4 is a block diagram showing the configuration of a second preferred embodiment according to the present invention.

In this preferred embodiment, a terminal voltage detection value $v_1$ from a voltage detector 9 is used as a replacement of the AC voltage instruction value vector $v_1^*$ shown in FIG. 3 for the calculation of the d-axis component $e_{2d}$ of the induced voltage $e_2$ in the induced voltage calculating circuit 10, and the remaining configuration is similar to that shown in FIG. 3.

Since the fundamental operations performed in this preferred embodiment are the same as those shown in FIG. 3, their explanations are omitted here to avoid repetition.

Figure 5:
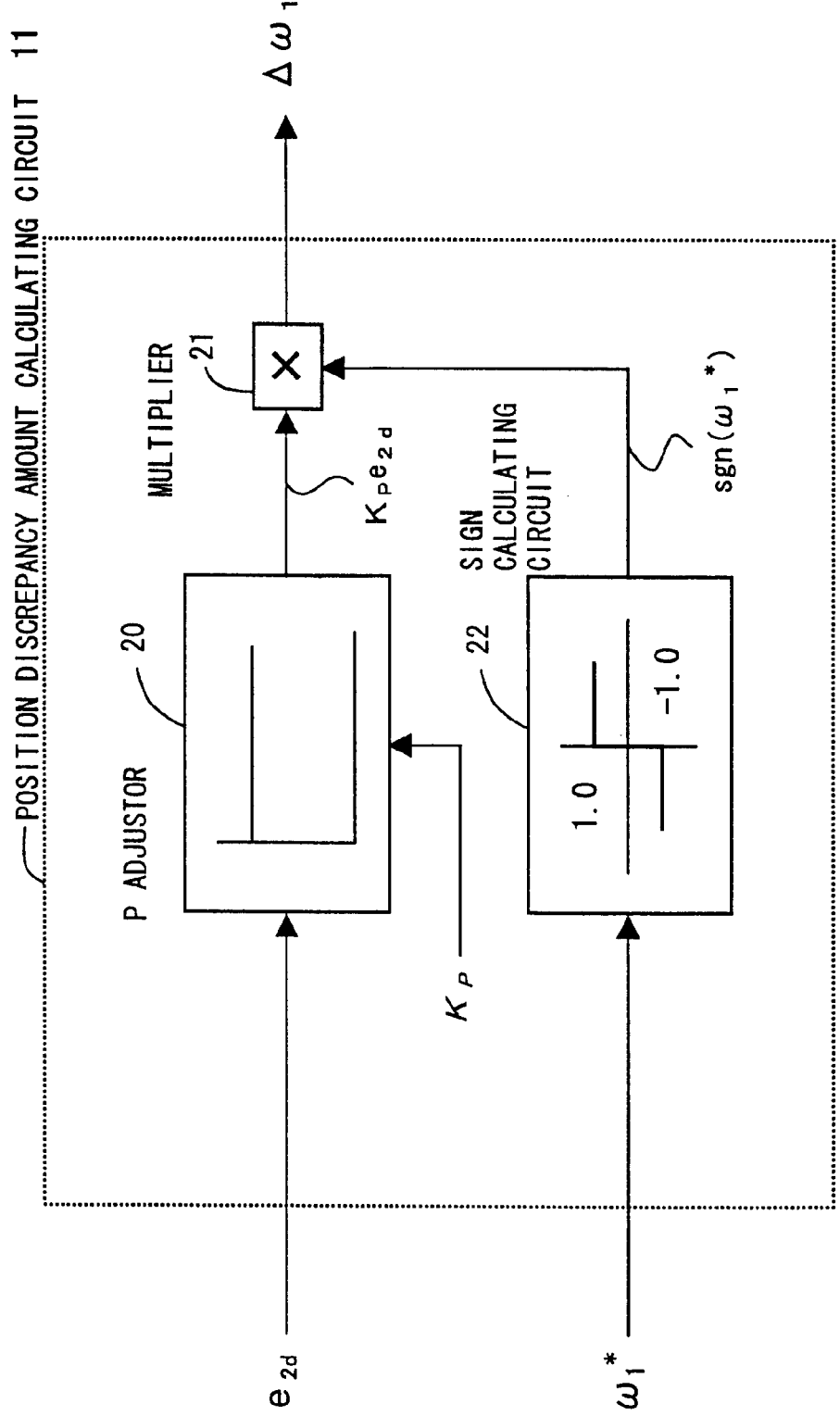
FIG. 5 is a block diagram showing the configuration of a third preferred embodiment according to the present invention.

FIG. 5 illustrates the principal part of a third preferred embodiment according to the present invention, and shows the configuration of the primary angular frequency compensation amount calculating circuit 11 shown in FIG. 3 or 4.

The primary angular frequency compensation amount calculating circuit 11 is configured by a P (Proportional) adjuster 20 to which the d-axis component $e_{2d}$ of the induced voltage $e_2$ is input, a sign calculating circuit 22 to which the first primary angular frequency instruction value $\omega_1^*$ is input, and a multiplier which multiplies the outputs of the P adjuster 20 and the sign calculating circuit 22. As stated earlier, the sign calculating circuit 22 outputs "1" being sign data sgn ($\omega_1^*$) if $\omega_1^* \geq 0$, and outputs "−1" being sign data sgn ($\omega_1^*$) if $\omega_1^* < 0$.

The multiplier 21 calculates the primary angular frequency compensation amount $\Delta\omega_1$ according to the calculation of the following expression 7, and uses the primary angular frequency compensation amount $\Delta\omega_1$ for the compensation of the first primary angular frequency instruction value $\omega_1^*$.

[Expression 7]

$$\Delta\omega_1 = sgn(\omega_1^*) \cdot K_p \cdot e_{2d}$$

Figure 6:
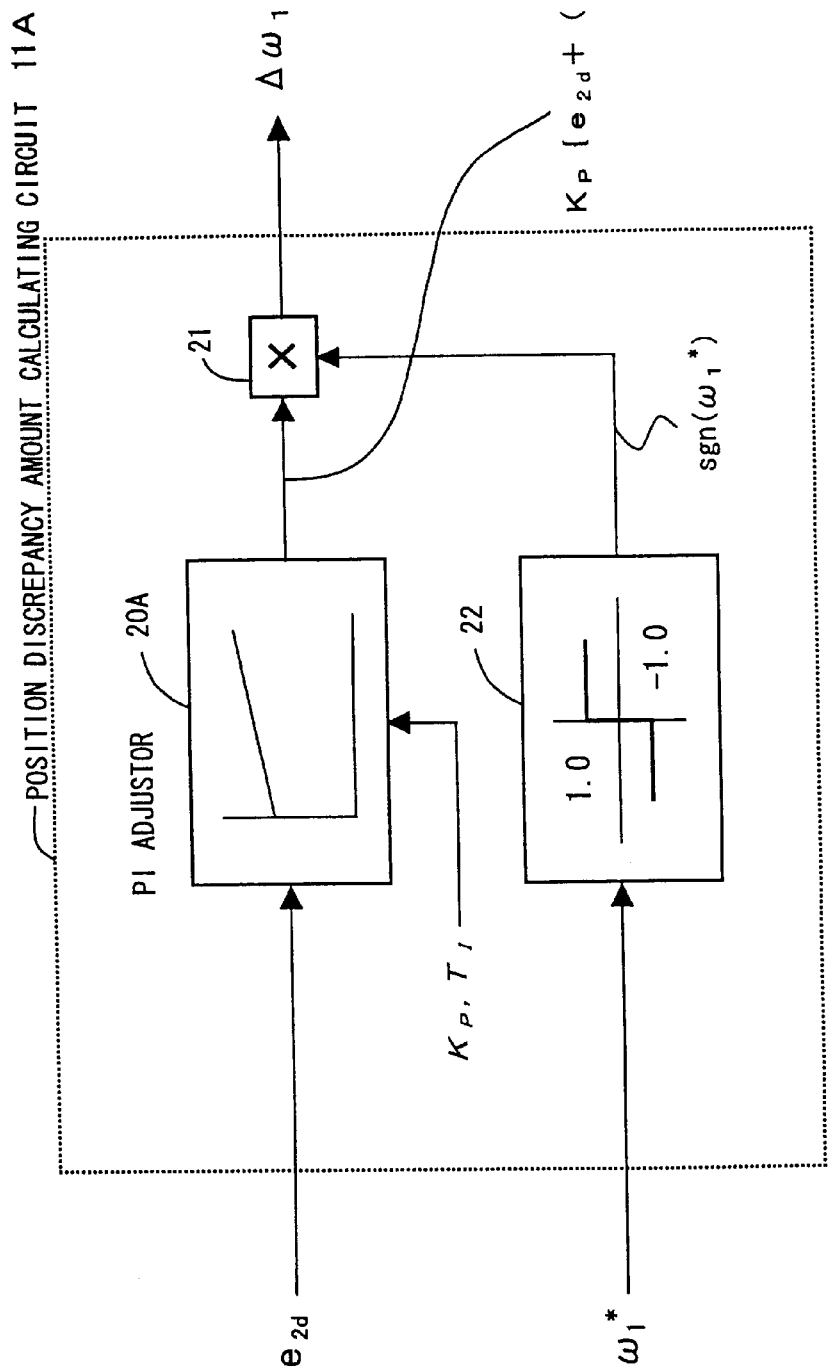
FIG. 6 is a block diagram showing the principal part of a fourth preferred embodiment according to the present invention.

FIG. 6 shows the principal part of a fourth preferred embodiment according to the present invention, and illustrates the configuration where a primary angular frequency compensation amount calculating circuit 11A comprises a PI (Proportional Integration) adjuster 20A.

Calculation of the primary angular frequency compensation amount $\Delta\omega_1$, in this preferred embodiment is the one represented by the expression 5, and the primary angular frequency compensation amount $\Delta\omega_1$ calculated based on the expression 5 is output from the multiplier 21.

As described above, according to the present invention, attention is paid to the d-axis component of an induced voltage vector if an axial discrepancy exists, and a second primary angular frequency instruction value is generated by compensating the first primary angular frequency instruction value for the position discrepancy amount obtained with a proportional operation or a proportional integration operation by using the d-axis component and the sign of the first primary angular frequency instruction value, whereby the axial discrepancy angle between a variable-speed controlling device and an induction motor is reduced to "0", and the induction motor can be variable-speed-controlled with high efficiency by generating the magnetic flux or the torque according to an instruction value.

What is claimed is:

1. A variable-speed controlling device for use with an induction motor, comprising:

a voltage instruction value calculating unit to calculate an alternating current voltage instruction value on d-q axes rotating coordinates rotating at an angular velocity equal to a primary angular frequency instruction value by using the primary angular frequency instruction value and a secondary magnetic flux instruction value;

an integrating unit to calculate a phase angle instruction value by integrating the primary angular frequency instruction value;

a power converting circuit to perform power conversion according to the alternating current voltage instruction value obtained from the alternating voltage instruction value and the phase angle instruction value, and to supply an alternating current voltage to an induction motor;

a current detecting unit to detect a current of the induction motor;

an induced voltage calculating unit to calculate a d-axis component of an induced voltage vector of the induction motor from the alternating current voltage instruction value vector, an output of said current detecting unit, a first primary angular frequency instruction value, and a motor constant;

a primary angular frequency compensation amount calculating unit calculating a primary angular frequency compensation amount from the first primary angular frequency instruction value and the calculation result of the d-axis component of the induced voltage vector from said induced voltage calculating unit; and a compensating unit to generate a second primary angular frequency instruction value provided to said voltage instruction value calculating unit and said integrating unit by adding the primary angular frequency compensation amount to the first primary angular frequency instruction value.

2. A variable-speed controlling device for use with an induction motor, comprising:

a voltage instruction value calculating unit to calculate an alternating current voltage instruction value on d-q axes rotating coordinates rotating at an angular velocity equal to a primary angular frequency instruction value by using the primary angular frequency instruction value and a secondary magnetic flux instruction value;

an integrating unit to calculate a phase angle instruction value by integrating the primary angular frequency instruction value;

a power converting circuit to perform power conversion according to an alternating current voltage instruction value vector obtained from the alternating current voltage instruction value and the phase angle instruction value, and to supply an alternating current voltage to an induction motor;

a current detecting unit to detect a current of the induction motor;

a voltage detecting unit to detect a terminal voltage of the induction motor;

an induced voltage calculating unit to calculate a d-axis component of an induced voltage vector of the induction motor from an output of said voltage detecting unit, an output of said current detecting unit, a first primary angular frequency instruction value, and a motor constant;

a primary angular frequency compensation amount calculating unit calculating a primary angular frequency compensation amount from the first primary angular frequency instruction value and the calculation result of the d-axis component of the induced voltage vector from said induced voltage calculating unit; and a compensating unit to generate a second primary angular frequency instruction value provided to said voltage instruction value calculating unit and said integrating unit by adding the primary angular frequency compensation amount to the first primary angular frequency instruction value.

3. The variable-speed controlling device according to claim 1, wherein said primary angular frequency compensation amount calculating unit performs a proportional operation by using the d-axis component as an input, and calculates the primary angular frequency compensation amount by multiplying a result of the proportional operation and sign data of the first primary angular frequency instruction value.

4. The variable-speed controlling device according to claim 1, wherein said primary angular frequency compensation amount calculating unit performs a proportional integration operation by using the d-axis component as an input, and calculates the primary angular frequency compensation amount by multiplying a result of the proportional integration operation and sign data of the first primary angular frequency instruction value.

5. The variable-speed controlling device according to claim 2, wherein said primary angular frequency compensation amount calculating unit performs a proportional operation by using the d-axis component as an input, and calculates the primary angular frequency compensation amount by multiplying a result of the proportional operation and sign data of the first primary angular frequency instruction value.

6. The variable-speed controlling device according to claim 2, wherein said primary angular frequency compensation amount calculating unit performs a proportional integration calculation by using the d-axis component as an input, and calculates the primary angular frequency compensation amount by multiplying a result of the proportional integration operation and sign data of the first primary angular frequency instruction value.

7. A variable-speed controlling device for use with an induction motor, comprising:

voltage instruction value calculating means for calculating an alternating current voltage instruction value on d-q axes rotating coordinates rotating at an angular velocity equal to a primary angular frequency instruction value by using the primary angular frequency instruction value and a secondary magnetic flux instruction value;

integrating means for calculating a phase angle instruction value by integrating the primary angular frequency instruction value;

a power converting circuit for performing power conversion according to the alternating current voltage instruction value obtained from the alternating voltage instruction value and the phase angle instruction value, and for supplying an alternating current voltage to an induction motor;

current detecting means for detecting a current of the induction motor;

induced voltage calculating means for calculating a d-axis component of an induced voltage vector of the induction motor from the alternating current voltage instruction value vector, an output of said current detecting unit, a first primary angular frequency instruction value, and a motor constant;

primary angular frequency compensation amount calculating means for calculating a primary angular frequency compensation amount from the first primary angular frequency instruction value and the calculation result of the d-axis component of the induced voltage vector from said induced voltage calculating unit; and compensating means for generating a second primary angular frequency instruction value provided to said voltage instruction value calculating unit and said integrating unit by adding the primary angular frequency compensation amount to the first primary angular frequency instruction value.

* * * * *

UNITED STATES PATENT AND TRADEMARK OFFICE
CERTIFICATE OF CORRECTION

PATENT NO. : 6,404,162 B1
DATED : June 11, 2002
INVENTOR(S) : Hirokazu Tajima

It is certified that error appears in the above-identified patent and that said Letters Patent is hereby corrected as shown below:

Column 4,
Line 10, please insert the following equation:
$$-- e_{2d} = p\Phi_{2d} - \omega_1\Phi_{2q} = v_{1d} - (R_1 + pL\sigma) i_{1d} + \omega_1 L\sigma i_{1q} --.$$
Line 11, please delete "$e_{2q} = \omega_1\Phi_{2d} + p\Phi_{2q} - v_{1q} - (R_1 + pL\sigma) i_{1q} - \omega_1 L\sigma i_{1d}$" and insert
$$-- e_{2q} = \omega_1\Phi_{2d} + p\Phi_{2q} = v_{1q} - (R_1 + pL\sigma) i_{1q} - \omega_1 L\sigma i_{1d} --.$$

Signed and Sealed this

Twentieth Day of July, 2004

JON W. DUDAS
*Acting Director of the United States Patent and Trademark Office*